Dec. 26, 1961  H. JACOBI  3,014,501
FLEXIBLE TUBES
Filed Aug. 13, 1957

INVENTOR
HELMUT JACOBI
BY
ATTORNEY

United States Patent Office 3,014,501
Patented Dec. 26, 1961

3,014,501
FLEXIBLE TUBES
Helmut Jacobi, Burgkirchen, Upper Bavaria, Germany, assignor to Farbwerke Hoechst Aktiengesellschaft vormals Meister Lucius & Brüning, Frankfurt am Main, Germany, a corporation of Germany
Filed Aug. 13, 1957, Ser. No. 677,847
Claims priority, application Germany Aug. 14, 1956
3 Claims. (Cl. 138—122)

The present invention relates to a process for preparing flexible tubes.

The use of tubes of polyvinyl chloride is known. These tubes are rigid and cannot substantially be bent in the cold.

Now, I have found that flexible tubes consisting of one or more bands which are helically wound, in the direction of the axis of winding by compression and thermally welded can be prepared by using bands of polyvinyl chloride which are provided on one side or on both sides with a heat sealing coating of a thermoplastic material. These bands may be used either alone or in combination with bands of paper, textile fibers, metal foils, cellophane or other plastics.

Polyvinyl chloride provided with a heat sealing coating can be used with particular advantage in the process of the present invention since it is especially well suited for the necessary mechanical treatment, i.e. the winding operation and the compression in longitudinal direction, and since the heat sealing coating produces a very rapid and uniform welding of the neighboring layers in the subsequent thermal after-treatment at temperatures in the range of, for example, 60 to 120° C., which aftertreatment brings about the strengthening and bonding of the tube.

A material suitable for use in the process of the invention is, for example, a band of polyvinyl chloride free from plasticizer, which band has a width of 10 to 50 millimeters, preferably 20 millimeters, and a thickness of 0.02 to 0.1 millimeter, preferably 0.04 millimeter. Said band is provided on one side or on both sides with a heat sealing coating of a copolymer of an acrylic acid ester and/or a copolymer of vinyl chloride or vinylidene chloride. As material for the heat sealing coating there may be used, for example, polyacrylic acid ethyl ester, polyacrylic acid-n-butyl ester, copolymers of vinyl chloride and vinyl acetate, copolymers of vinyl chloride, vinyl acetate and maleic acid as well as derivatives of maleic acid, copolymers of vinyl chloride and vinyl isobutyl ether, and polyvinylidene chloride.

Figure 1:
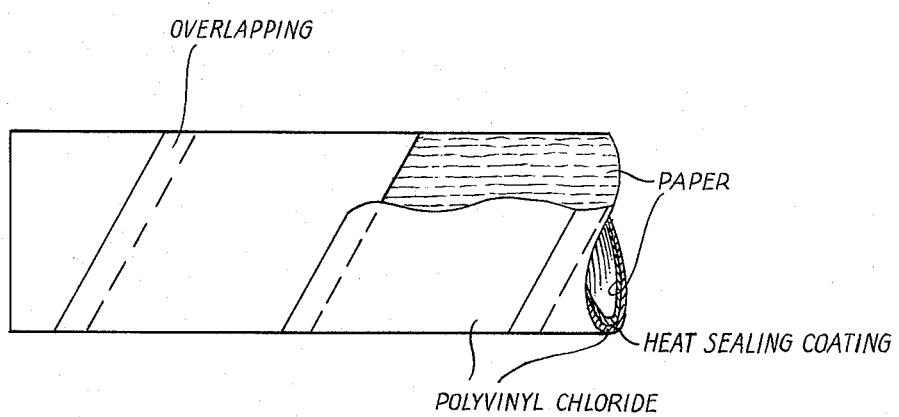
Figure 2:
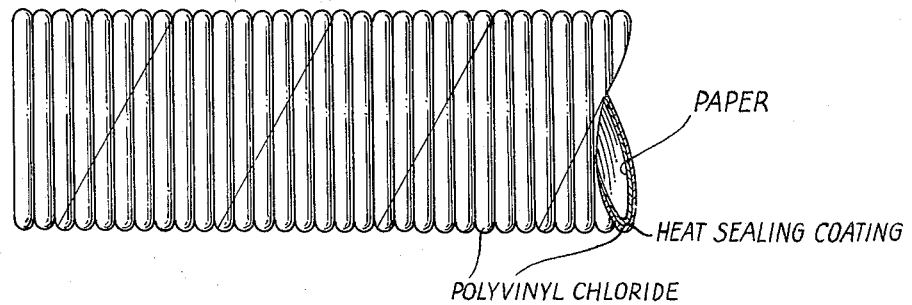

The accompanying drawing shows as an example a tube consisting of a layer of paper and a layer of polyvinyl chloride which is on one side provided with a heat sealing coating. FIG. 1 shows the helical winding of the tape material, FIG. 2 shows the tube after having been corrugated in order to develop circular grooves which cause the flexibility of the tube.

The flexible tubes obtained by the process of the invention, the diameter and wall thickness of which may vary within wide limits, have a wide range of application due to their good cohesion, strength and good flexibility. They may be used, for example, as connecting members for compressed-air pipes or as tubes for vacuum cleaners.

Obviously many modifications and variations of the present invention are possible in the light of the above teachings. It is, therefore, to be understood that within the scope of the appended claims the invention may be practiced otherwise than as specifically described.

I claim:
1. A flexible tube consisting of at least one strip of polyvinyl chloride helically wound upon itself in overlapping convolutions, a thermoplastic coating disposed on at least one face of said strip, said overlapping convolutions being sealed together by said coating, said tube having helical corrugations substantially perpendicular to the tube axis.

2. A flexible tube consisting of at least one strip of polyvinyl chloride and at least one additional strip of flexible windable material other than polyvinyl chloride, a thermoplastic coating disposed on at least one side of said polyvinyl strip, said strips being helically wound upon themselves to form overlapping convolutions which are sealed together by said coating, said tube having helical corrugation grooves substantially perpendicular to the tube axis.

3. A flexible tube consisting of helically wound strips of unplasticized polyvinyl chloride, said strips having a width in the range of 10 to 50 mm. and a thickness in the range of 0.02 to 0.1 mm., a thermoplastic coating provided on at least one side of said strips, said strips being helically wound upon themselves to form overlapping convolutions which are sealed together by said coating, said coating being selected from the group consisting of polyacrylic acid ethylester; polyacrylic acid n-butylester; copolymers of vinyl chloride and vinyl acetate; copolymers of vinyl chloride, vinyl acetate and maleic acid; copolymers of vinyl chloride, vinyl acetate and derivatives of maleic acid; and copolymers of vinyl chloride, vinyl isobutyl ether and polyvinylidene chloride; and helical corrugation grooves on the tube surface substantially perpendicular to the tube axis.

References Cited in the file of this patent

UNITED STATES PATENTS

| | | |
|---|---|---|
| 2,042,644 | Walter | June 2, 1936 |
| 2,633,434 | Tanner | Mar. 31, 1953 |
| 2,688,906 | Dokopil | Sept. 14, 1954 |
| 2,748,805 | Winstead | June 5, 1956 |
| 2,819,180 | Koenig | Jan. 7, 1958 |
| 2,884,957 | Harris | May 5, 1959 |

FOREIGN PATENTS

| | | |
|---|---|---|
| 588,858 | Great Britain | June 4, 1947 |
| 716,183 | Great Britain | Sept. 29, 1954 |
| 719,638 | Great Britain | Dec. 8, 1954 |